United States Patent Office 3,817,829
Patented June 18, 1974

3,817,829
NUCLEAR REACTOR INTERNALS CONSTRUCTION AND FAILED FUEL ROD DETECTION SYSTEM
Erling Frisch, Pittsburgh, and Harry N. Andrews, Export, Pa., assignors to Westinghouse Electric Corporation, Pittsburgh, Pa.
Filed Jan. 21, 1972, Ser. No. 219,781
Int. Cl. G21c 17/06
U.S. Cl. 176—19 LD        8 Claims

ABSTRACT OF THE DISCLOSURE

A system is provided for determining during operation of a nuclear reactor having fluid pressure operated control rod mechanisms the exact location of a fuel assembly with a defective fuel rod. The construction of the reactor internals is simplified in a manner to facilitate the testing for defective fuel rods and to reduce the cost of producing the upper internals of the reactor.

BACKGROUND OF THE INVENTION

This invention relates generally to nuclear reactors and, particularly, to reactors having fluid pressure operated control rod mechanisms.

The core of a modern pressurized water cooled reactor of 1000 mwe. output contains approximately 40,000 individual fuel rods, each having two welded end plugs. The total length of the rods is nearly 100 miles. With the high number of welds and large clad surface area, there is a probability that one or more fuel rods will develop defects during operation even though the highest grade of quality control is maintained during the manufacture of the rods. The defects probably will be in the form of pin holes or cracks in welds or cladding material. In any case, it permits escape of some of the fission products into the coolant stream and causes a rise in radioactivity in the entire coolant system. (The most abundant of the fission products are Kr88, Rb88, I131, I133, Xe133, Xe135 and Cs137.) A certain amount of fission product leakage can be tolerated without causing too much of a problem, since the level of radioactivity can be limited by continuous removal of the fission products with available systems. For example, the Xenon gases are removed by gas stripping techniques in the volume control tank and the gas decay tank, while the others are removed in the demineralizers. However, if the leakage of fission products into the coolant exceeds the capacity of these systems, the general level of radioactivity gradually increases until it exceeds permissible limits and it becomes necessary to shut down the reactor or, at least, to continue operation at reduced power.

After the reactor is shut down, the task of locating and removing the defective fuel assembly still remains. In prior nuclear power plants, means are available for determining during operation only that a leaky fuel assembly is present in the core and, at best, in which quadrant it is located. Pin-pointing of the fuel assembly requires removal of all fuel assemblies in turn to a special inspection chamber for testing. Since the production of fission products ceases at shutdown and the possibility exists that a crack may seal itself when the temperature is reduced, the detection of a defective fuel assembly becomes a very difficult and intricate task which may require a month or more of reactor shutdown time.

Therefore, it is desirable to provide a system for determining the exact location of a defective fuel assembly during normal reactor operation to permit speedy removal of the assembly before conditions become intolerable, or preferably during a scheduled shutdown. The latter becomes a real possibility if a "Rapid Refueling" system is adapted since scheduled refuelings take place at much shorter intervals than with conventional reactors. Also, it is desirable to simplify the structure of the upper internals of a reactor to facilitate testing for a defective fuel assembly.

SUMMARY OF THE INVENTION

In accordance with the present invention, a nuclear reactor having fluid pressure operated control rod drive mechanisms is provided with completely enclosed guide tubes for the control rods and their drive shafts. The guide tubes are mounted inside support tubes extending between the upper core plate and the upper support plate of the reactor internals. The control rod drive shafts enter the reactor vessel head through adapters having the drive mechanisms mounted exteriorly of the vessel. The control rod mechanism fluid pressure system is utilized for failed fuel rod detection by obtaining coolant samples from all fuel assemblies provided with control rods. A defect in any of these fuel assemblies, which constitute 35 to 40 percent of the total number, can be located directly and without difficulty. A sample of the coolant from a selected fuel assembly is caused to flow directly to the fluid pressure mechanism through an isolated guide tube and associated adapter tube. The coolant passes through the mechanism and then to a radiation monitor. A sealing arrangement is provided between the lower end of the adapted tube and the top of the guide tube assembly to insure that sampling water is not permitted to mix with water above the upper support plate before arriving at the adapter tube.

Defects in other fuel assemblies can be located by indirect methods. By suppressing the power output of a tested, non-defective fuel assembly of the above group by temporarily inserting all control rods, coolant from adjoining assemblies is caused to mix with coolant from the tested assembly in sufficient quantities to determine if any of these has developed a defect. Pinpointing of a defective assembly is them accomplished by testing in the immediate neighborhood.

BRIEF DESCRIPTION OF THE DRAWINGS

For a better understanding of the nature of the invention, reference may be had to the following detailed description, taken in conjunction with the accompanying drawings, in which:

FIG. 10 is a detail view, in section, of a modified seal structure for the seal cup shown in FIG. 6.

DESCRIPTION OF PREFERRED EMBODIMENTS

Figure 1:
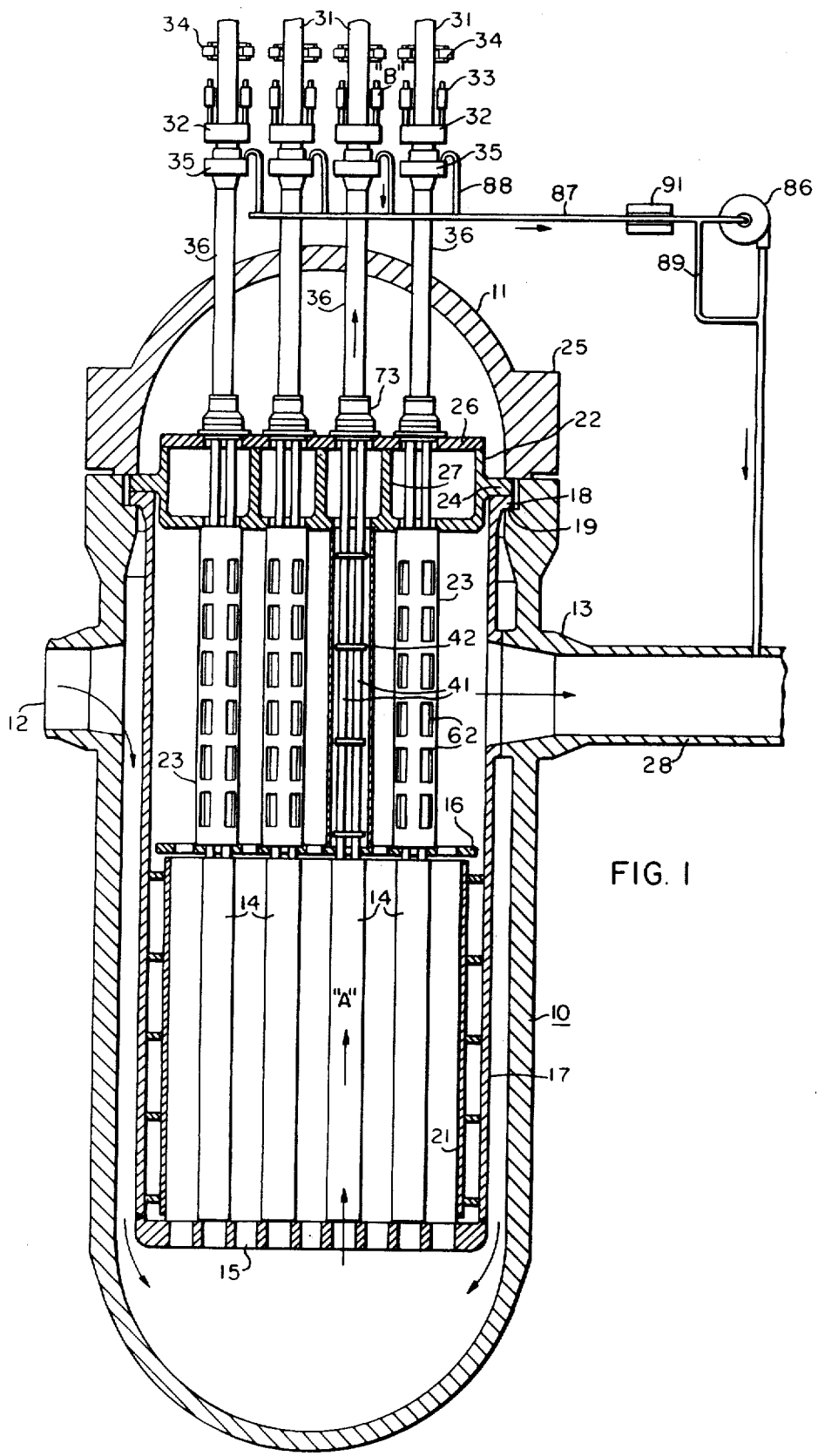
FIG. 1 is a view, partly in section and partly in elevation, of a nuclear reactor embodying principal features of the invention.

Referring to the drawings, particularly to FIG. 1, the reactor shown therein comprises a pressure vessel 10, having a removable closure head 11 attached to the vessel by a plurality of bolts (not shown). The vessel 10 may be of a type well known in the art suitable for containing a fluid coolant at a relatively high pressure. In the present case the coolant utilized is light water. However, other suitable fluids may be utilized as a coolant if desired. The vessel 10 has an inlet nozzle 12 and an outlet nozzle 13. The coolant is circulated through the reactor vessel in a manner well known in the art by means of a pump (not shown). Fuel assemblies 14 are mounted within the vessel between a lower core plate 15 and an upper core plate 16. The fuel assemblies constitute the reactor core. The lower core plate 15 is attached by welding to a core barrel 17 having an upper flange 18 which rests on a ledge 19 of the pressure vessel 10. The core periphery is bordered by a form fitting baffle structure 21 which limits the core by-pass flow of the coolant. The upper core plate 16 is supported from a deep-beamed upper support plate 22 by means of a plurality of support tubes 23 which are attached to the two plates by bolting, as described hereinafter. A flange 24 on the upper support plate is held between the flange 25 of the closure head and the core barrel flange 18. A top plate 26 covers the upper side of the upper support plate, to which it is attached by bolting (not shown). The heavy beam construction 27, shown for the upper support plate, is required to resist the load exerted on it by the upper core plate if a major break in one of the outlet coolant pipes 28 should occur.

The reactor is provided with fluid pressure operated control rod drive mechanisms 31 which may be of a type described in Patent No. 3,607,629, issued September 21, 1971 to Erling Frisch and Harry Andrews and assigned to the Westinghouse Electric Corporation. As described in the aforesaid patent, the pressure of the fluid coolant within the vessel 10 is utilized to operate the control rods. In the present case eight individual control rod units are associated with one mechanism. The valves for individually controlling the operation of the control rod units are located in a lower flange 32 of each mechanism 31 and are controlled by magnet coils 33. The control rods are raised by the fluid pressure and are retained in their raised position by means of electromagnets 34 mounted on the mechanism. The mechanisms are attached by bolting (not shown) to upper flanges 35 on adapter tubes 36 which penetrate the pressure vessel closure head 11 to which they are attached by welding.

As shown more clearly in FIGS. 2, 3, 4 and 6, control rod drive shafts 37 enter the reactor interior through the adapter tubes 36 and, in the present case, each drive shaft 37 is attached to a pair of control rods 38 by a spider 39. Between the adapter tubes 36 and the fuel assemblies 14 the control rods and the drive shafts operate with a rectilinear movement in completely enclosed guide tubes 41.

The support tubes 23 serve a second, but important, function; namely that of aligning and supporting the control rod guide tubes 41. Heretofore, the guide tube assemblies have been located between the support tubes and have been provided with their own support structures. This clutters up the space above the core and acts as an obstruction to cross flow of coolant to the outlet nozzles besides increasing to a considerable extent the cost of producing the upper internals of the reactor.

Figure 2:
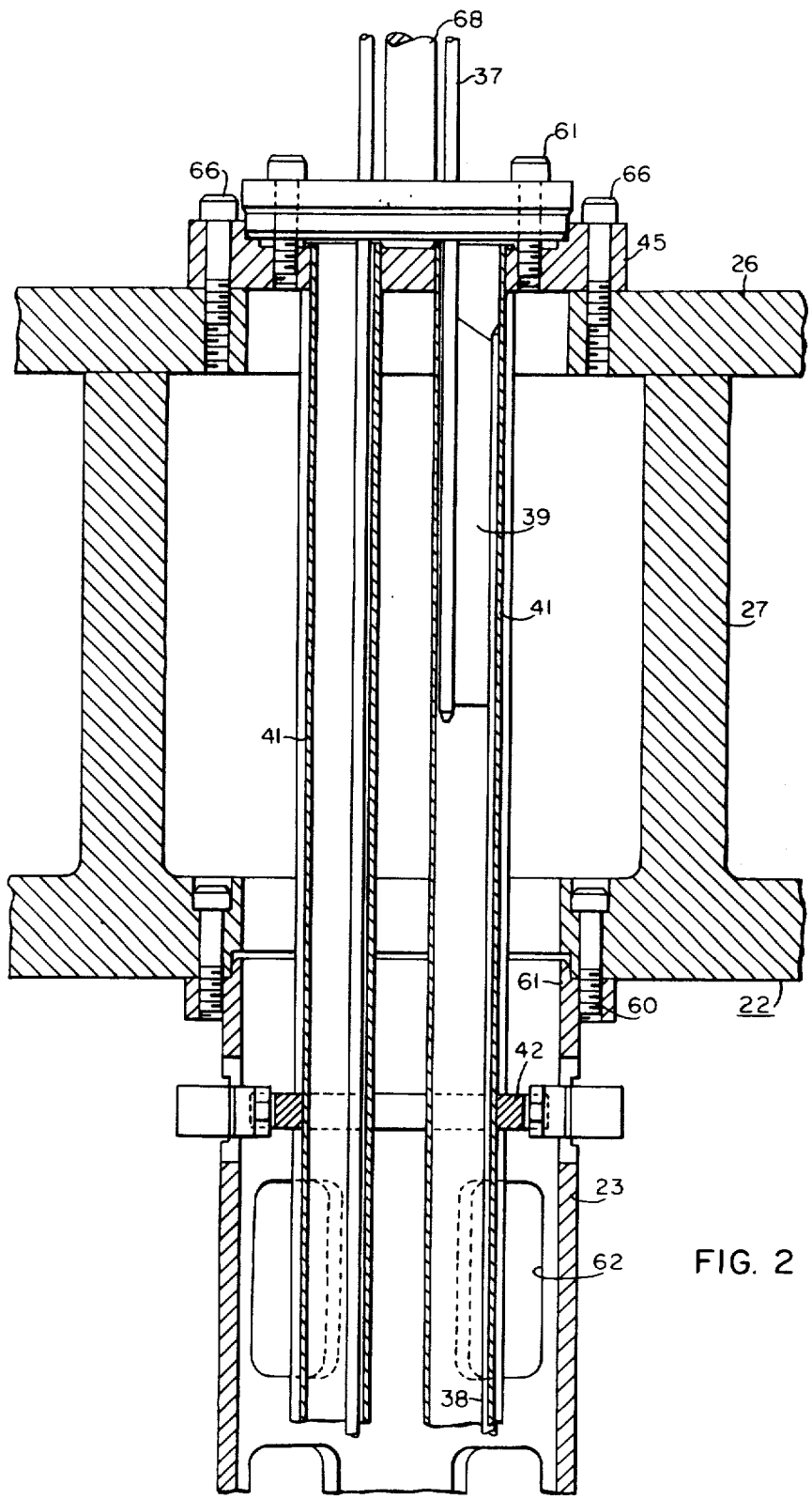
FIGS. 2 and 3, taken end-to-end, constitute an enlarged view, in section, of a portion of the internals of the reactor shown in FIG. 1.
Figure 3:
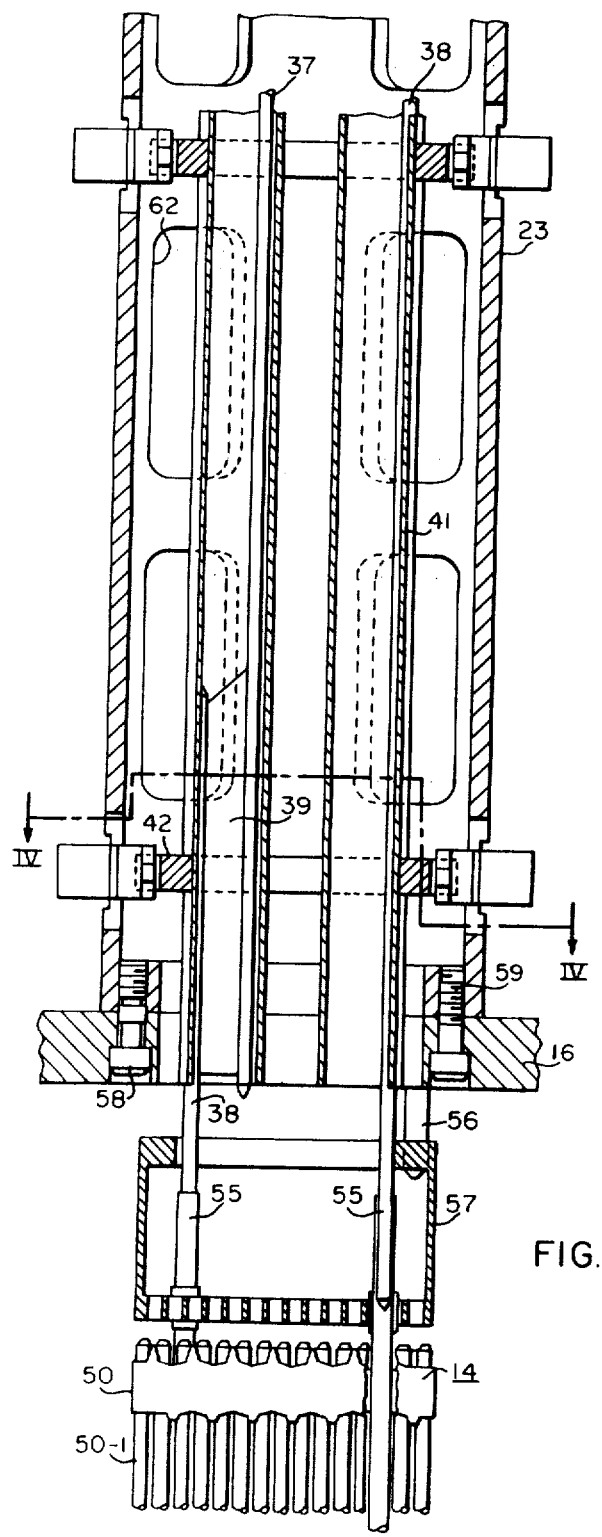
Figure 4:
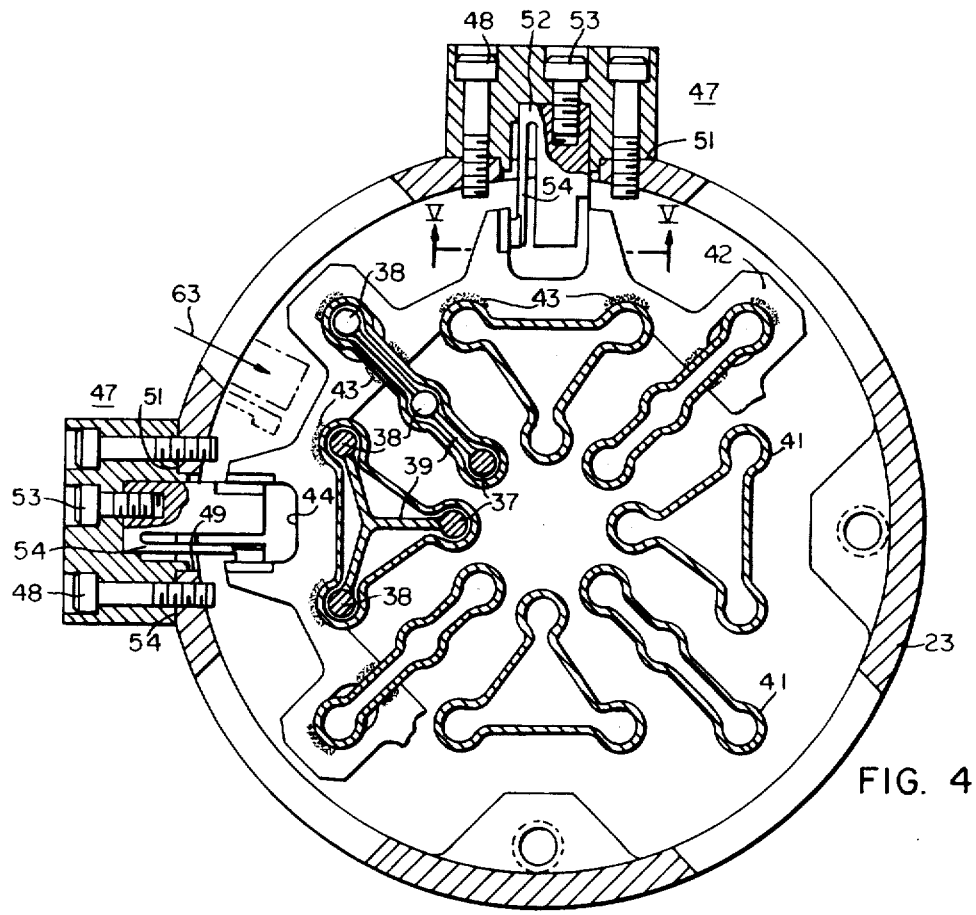
FIG. 4 is a view, in section, taken along the line IV—IV in FIG. 3.
Figure 5:
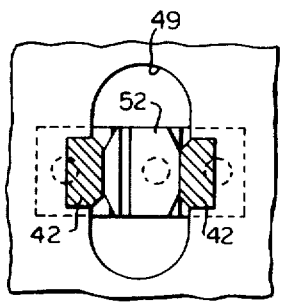
FIG. 5 is a detail view, in section, taken along the line V—V in FIG. 4.

As shown more clearly in FIGS. 2 and 3, the guide tubes 41 extend uninterrupted from the top plate 26 of the upper support plate 22 to a few inches above the fuel assemblies 14. As shown in FIG. 4, part of the guide tubes are generally triangular in cross section and part are generally oblong in cross section. The support tubes 23 are generally cylindrical and the drive shafts 37 which are attached to the control rods 38 for a preselected fuel assembly are arranged in a circle about the center line of the support tube containing the drive shafts and control rods for that fuel assembly. The guide tubes 41 are also arranged in a circle with the oblong guide tubes disposed between the triangular guide tubes. Each guide tube has generally circular portions formed integrally therewith for receiving and guiding the drive shaft and the two control rods attached to each drive shaft. The guide tubes may be produced from round tubing by roll forming over internal mandrils.

Figure 6:
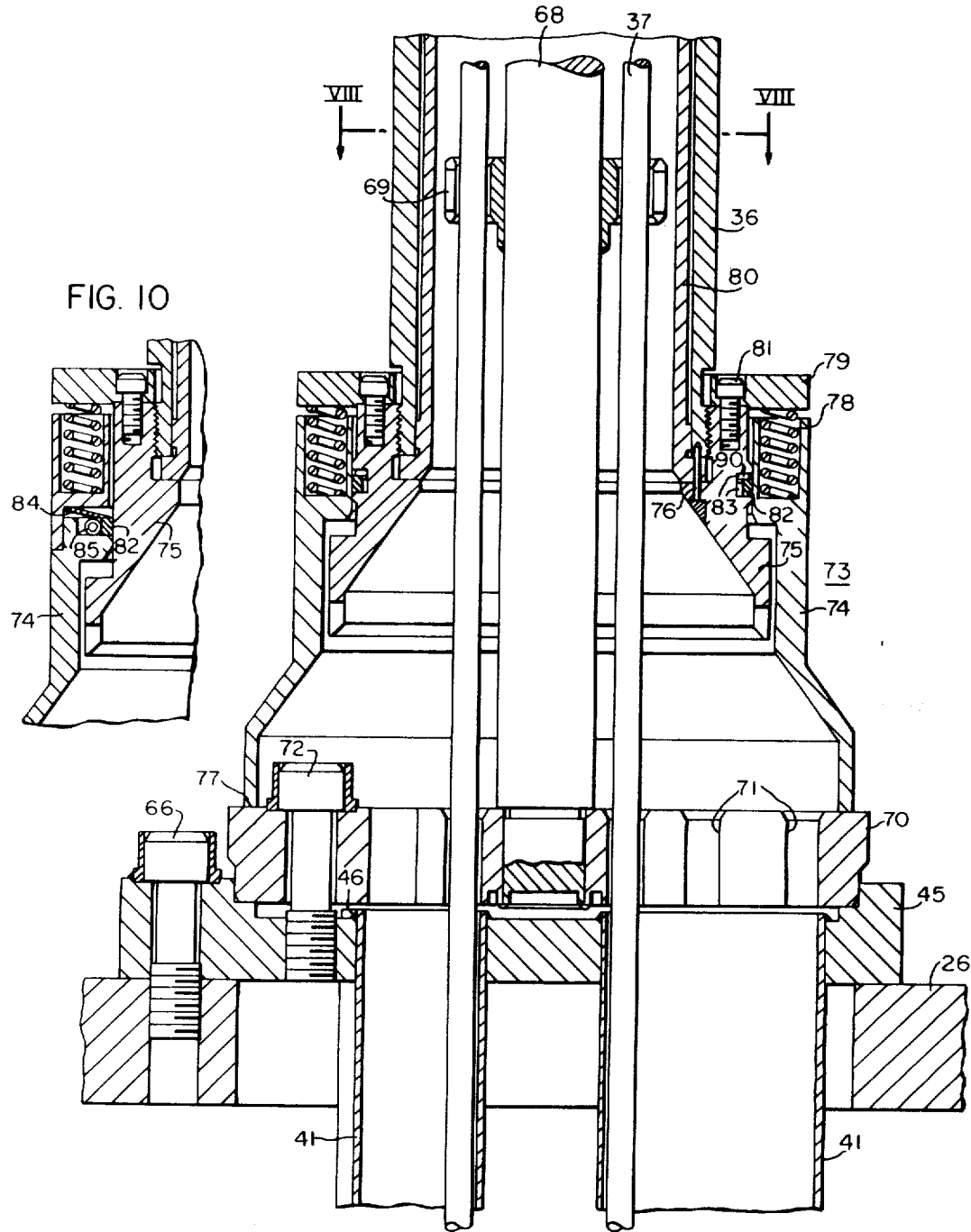
FIG. 6 is a view, in section, taken along the line VI—VI in FIG. 7, of a guide tube column seal cup utilized in the reactor.

The relative lateral position of the eight guide tubes 41, associated with one control rod mechanism is maintained by a number of generally ring-shaped support plates 42 which are spaced at distances of approximately two feet along the length of the tubes. As shown in FIG. 4, the support plates 42 are cut in the form of an odd-shaped ring to offer minimum resistance to the vertical flow of coolant from the fuel assemblies. The guide tubes are attached to the plates by spot welds 43 on both sides of the plate. The plate 42 may be produced at a relatively reasonable cost by electro-chemical machining techniques followed by more accurate spot machining in the vicinity of the welds and also of four locating slots 44 angularly spaced in the outer periphery of each plate. At their upper end the guide tubes for each support tube are attached to a generally square end plate 45 (see also FIG. 6) which is solid except for contoured holes provided for tube penetration. The attachment to the end plate 45 is obtained by welding at 46 along the entire periphery of the tubes to provide a leak-proof joint as shown in FIG. 6.

The guide tube assembly is aligned in the support tube 23 by a series of keys 47 which are attached by bolts 48 to the outside of the support tube. Accurate location of the keys with relation to the support tube flanges is obtained by fitting the keys into oblong holes 49 machined in the tube walls. Local flat spots 51 on the outside tube surface provide proper seating of the keys. Actual alignment between the keys and the guide tube plates 42 is obtained by inserts 52 attached to the keys by bolts 53. Firm contact between the insert and plate slot 44 is insured by a cantilever spring 54 provided with the insert. The spring must be sufficiently stiff to maintain contact and prevent fretting for any condition of vibratory forces developed by the coolant flow. If special, hard machining material is not required for the spring, the key and the spring may be made in one integral piece.

In the fuel assemblies, the control rods operate in cylindrical guide tubes 55 which also serve as the main structure members for the assembly. Because of the relatively close clearances available for the control rods in these tubes and also in the guide tubes 41, it is of great importance that the fuel assemblies and the associated support tubes are accurately aligned. Alignment of a fuel assembly in relation to the upper core plate 16 is achieved by means of two dowel pins 56, with tapered ends, secured to the core plate. The tapered ends of the dowel pins 56 enter holes in the fuel assembly top nozzle 57 when the upper internals are lowered into the reactor vessel. The individual fuel rods 50-1 are supported laterally in the fuel assembly by several axially spaced egg-crate support grids 50 of a type as described in U.S. Patent 3,379,617 by Andrews and Keller and assigned to Westinghouse Electric Corporation. The grids are, in turn, supported by the guide tubes 55 in which they are attached by welding.

Alignment of the support tube 23 with the core plate 16 is achieved by two close fitting shoulder bolts 58 which in addition to two regular bolts 59 serve to secure the lower end of the support tube to the core plate 16. At its upper end, the support tube 23 is attached to the upper support plate 22 by four regular bolts 60, while center line positioning only is provided by a spigot fit between a projecting rim 61 on the upper end and a large circular hole in the support plate. Coolant water exits from the support tube through a number of large windows 62 cut in the tube wall. The windows 62 also serve as passage for some of the cross flow from other fuel assemblies.

Figure 9:
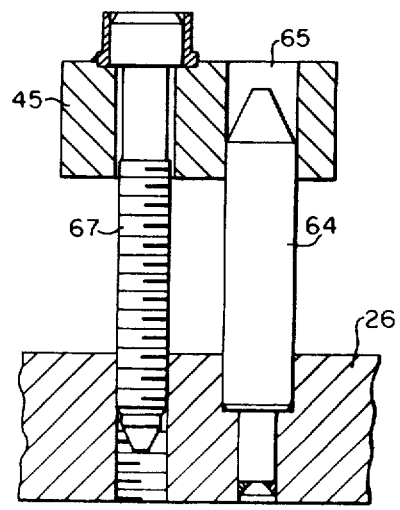
FIG. 9 is a view, in section, taken along the line IX—IX in FIG. 7.

After all the support tubes are secured to the upper core plate and to the upper support plate, the guide tube assemblies are inserted from above. In order to simplify this task, the assembly is rotated approximately 20° from its real position so that the relative position of the alignment keys 47 and the support plates 42 will be as indicated by the dot-dash lines and the arrow 63 in FIG. 4. This permits almost complete insertion without any interference. A short distance before reaching the fully inserted position, the assembly is rotated back and lowered further to permit the two alignment pins 64 in top plate 26 to enter associated holes 65 in the assembly end plate 45 as shown in FIG. 9. The free downward movement is finally checked when the slots 44 in the ring-shaped plates 42 come in contact with the alignment keys 47. To bring the assembly into its final position now requires a considerable downward force since the key springs for all support plates must be compressed simultaneously. This force may be produced conveniently by temporary utilization of special long fixture bolts 67 in the end plate mounting holes as shown in FIG. 9. By sequential tightening of these bolts, the end plate 45 is finally brought into contact with plate 26 after which regular bolts 66 are inserted, tightened and locked.

The unique construction of the guide tube assembly and its method of mounting make it possible to replace an assembly if this becomes necessary due to excessive wear during operation of a guide tube or for other reasons. Without this feature, damage to a guide tube assembly might require replacement of the entire upper internal structure.

Figure 7:
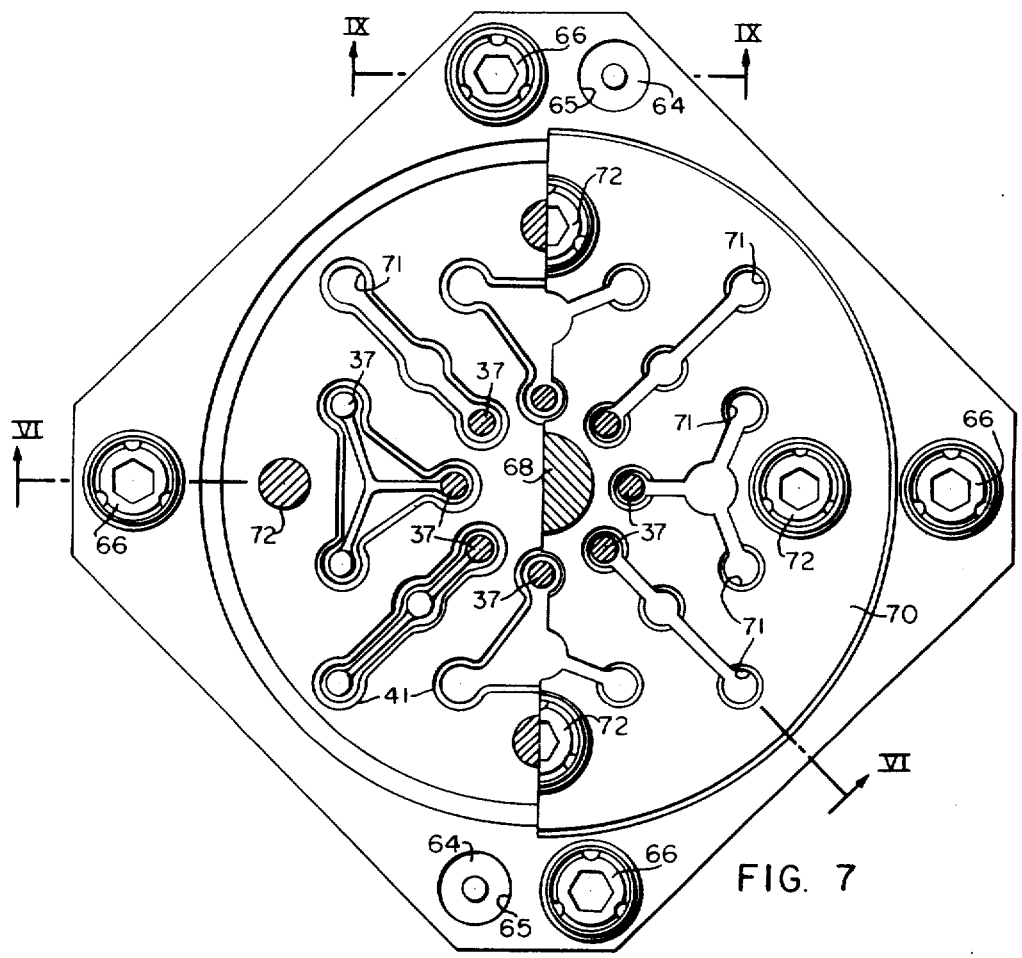
FIG. 7 is a view, partly in plan and partly in section, of a portion of the structure shown in FIG. 6.
Figure 8:
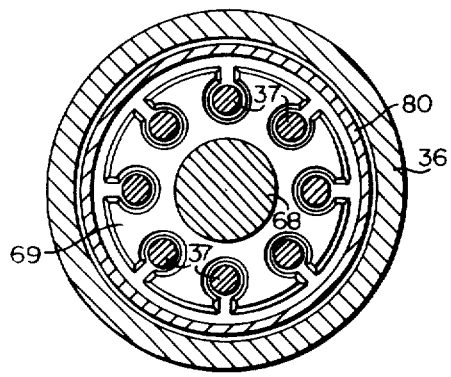
FIG. 8 is a view, in section, taken along the line VIII—VIII in FIG. 6.

As shown in FIG. 6, a support column 68 extends upwardly into the adapter tube 36. Several guide plates 69 attached to the column 68 by welding serve to guide the control rod drive shaft 37 in the space between the upper support plate and the externally mounted control rod drive mechanisms. The lower end of the support column 68 is secured to a base plate 70 by welding. As shown in FIG. 7, the base plate 70 has holes 71 therein for control rod penetration. The base plate 70 is mounted on top of the guide tube end plate 45 and secured by four bolts 72. This is normally done at the reactor site to simplify the shipment of the upper internals.

In order to utilize the control rod mechanism fluid pressure operating system for failed fuel rod detection, it is imperative that coolant samples, received from a fuel assembly through guide tubes 41, are not permitted to mix with the coolant above the upper support plates. To achieve this, it is necessary to provide a seal assembly 73 between the lower end of each control rod mechanism adapter 36 and the top surface of the support column base plate 70. As shown in FIG. 6, the seal assembly 73 comprises a generally conical cup 74 supported by a bushing 75 which is threaded on the lower end of the adapter tube 36 and secured by a pin 76. The seal cup has a flat lower rim 77 which contacts the upper surface of the base plate 70. The necessary contact pressure for sealing is provided by several coil springs 78 compressed by a ring 79 attached to the bushing 75 by screws 81. A tubular thermal shield 80 inside the adapter 36 has a flange clamped between the lower end of the adapter and the bushing 75. Considerable relative motion between the seal cup and its support bushing is possible to compensate for variations in the distance between adapters 36 and base plates 70 and to insure even contact pressure along the entire seal periphery in the event of slight angular variations. Sealing between the seal cup and the support bushing is achieved by means of a piston ring 82 disposed in a groove 90 in the bushing. The piston ring is held in contact with the seal cup and with the lower surface of the piston ring groove by two wave springs 83 disposed in the groove 90.

In the modified structure shown in FIG. 10, the piston ring 82 is held in contact with the cup 74 by means of a Belleville spring 84 and with the bushing 75 by means of a garter spring 85. The structures shown do not provide complete leakproofness, but this is not necessary because the amount of leakage is limited by the low differential pressure (less than 5 p.s.i.) to insignificant amounts. Sealing may be accomplished also with a structure utilizing bellows to obtain the necessary flexibility and spring action.

The method utilized for obtaining coolant samples directly from the outlet of a fuel assembly to an external radiation monitor is best understood by referring to FIG. 1. The 300–400 p.s.i. pressure drop, required for operation of the fluid pressure operated control rod mechanisms, is produced by a canned motor pump 86. The suction side of the pump is connected to a header line 87, to which the individual mechanisms are connected through feeder lines 88. The pump outlet is connected directly to the primary system through which the coolant is circulated. An orificed by-pass line 89 is provided around the pump to insure sufficient flow through the pump to prevent overheating when the mechanisms are not being operated. A radiation monitor 91 is mounted on the common header line.

Assuming now that it is desired to check fuel assembly "A" for a possible fuel rod failure. This is accomplished by energizing one of the valve operating coils "B" of the control rod mechanism located directly above the fuel assembly. It should be noted that the control rods are in their raised position during normal operation of the reactor and that they are retained in this position by the electromagnets 34, thereby permitting the valve operating coils to be deenergized during normal operation of the reactor. Opening of the valve causes coolant to flow directly to the mechanism through the previously described totally isolated system consisting of guide tubes 41, seal assembly 73 and mechanism adapter tube 36. As shown by the arrows, the coolant passes through the mechanism and eventually reaches the radiation monitor 91 through the low pressure header line 87. Since only one valve in the entire system is permitted to open during the test period, the coolant reaching the monitor is a true sample of the coolant passing through the fuel assembly being tested. Since the flow through the mechanism structure is limited to a relatively small quantity, a few seconds elapse from the time of a valve opening until the coolant sample arrives at the monitor. However, this does not affect the radiation measurement since the half-life of any of the fission products is not less than several hours. To obtain the desired information, the monitor reading is compared to a simultaneous reading of the general radiation level of the reactor coolant system.

Defects in other fuel assemblies can be located by indirect methods. By suppressing the power output of a tested, nondefective fuel assembly by temporarily inserting all control rods of that assembly, coolant from the adjoining assemblies is caused to mix with coolant from the tested assembly in sufficient quantities to determine if any of these has developed a defect. The fuel assemblies are not enclosed and mixing takes place along the entire length of adjacent assemblies. This is accomplished by opening one of the mechanism valves, thereby causing a sample of the coolant mixture to flow to the mechanism as hereinbefore described. Pinpointing of a defective assembly is now possible by testing in the immediate neighborhood.

From the foregoing description it is aparent that the invention provides a failed fuel rod detection system which greatly reduces the time heretofore required to locate a fuel assembly with defective fuel rods. The system is suitable for utilization with reactors having fluid pressure operated control rod drive mechanisms. The structure of the upper internals of a reactor is simplified to facilitate testing for a defective fuel assembly. The cost of producing the upper internals is reduced and the replacement of an individual guide tube assembly is made possible without requiring replacement of the entire upper internal structure.

We claim as our invention:

1. In a system for detecting a failed fuel rod in a nuclear reactor having a pressure vessel with a removable closure head and fuel assemblies mounted within the vessel between a lower core plate and an upper core plate and containing a fluid coolant under pressure, in combination, control rods rectilinearly movable into and out of preselected fuel assemblies for controlling the reactor, drive shafts attached to the control rods, adapter tubes extending through the closure head, said drive shafts entering the vessel through the adapter tubes, fluid pressure operated mechanisms for individually actuating the drive shafts to raise and lower the control rods by utilizing the pressure of the fluid coolant, valve means for selectively controlling the operation of the mechanisms, guide tubes for guiding the movement of the control rods and the drive shafts, said guide tubes and said adapter tubes providing a flow path for conducting coolant samples from selected fuel assemblies to the mechanisms, a radiation detecting device located externally of the reactor, and means for conducting the coolant samples from the mechanisms to the device to determine if a selected fuel assembly has a failed fuel rod.

2. The combination defined in claim 1, including electromagnetic means for retaining the control rods in the raised position.

3. The combination defined in claim 2, wherein the electromagnetic means and the valve means cooperate to cause a coolant sample to be obtained from a selected fuel assembly.

4. The combination defined in claim 1, including a seal assembly between the adapter tubes and the guide tubes for providing an isolated coolant sample conducting flow path for each adapter tube and its associated guide tubes.

5. The combination defined in claim 4, wherein the seal assembly includes an end plate mounted in the vessel and having the upper ends of the guide tubes secured thereto, a base plate mounted on the end plate, a bushing threaded on the lower end of the adapter tube, a generally conical seal cup movably supported by the bushing and having a flat rim contacting the top surface of the base plate, resilient means for maintaining contact pressure between the cup and the base plate, and seal means disposed between the cup and the bushing.

6. The combination defined in claim 5, wherein the seal means comprises a seal ring, and spring means for maintaining the ring in contact with the bushing and the seal cup.

7. The combination defined in claim 6, wherein the bushing has a groove therein, and the spring means comprises wave springs disposed in said groove.

8. The combination defined in claim 6, wherein the spring means comprises a Belleville spring and a garter spring.

References Cited

UNITED STATES PATENTS

| | | | |
|---|---|---|---|
| 2,777,812 | 1/1957 | Powell et al. | 176—19 LD |
| 3,178,355 | 4/1965 | Jacobs | 176—19 LD |
| 3,533,912 | 10/1970 | Dempsey | 176—36 R |
| 3,607,629 | 9/1971 | Frisch et al. | 176—36 R |
| 3,612,860 | 10/1971 | Hackney. | |

REUBEN EPSTEIN, Primary Examiner

U.S. Cl. X.R.

176—36